US006660106B1

United States Patent
Babel et al.

(10) Patent No.: US 6,660,106 B1
(45) Date of Patent: Dec. 9, 2003

(54) METHODS OF MANUFACTURE OF SPIN-FORMING BLANKS, PARTICULARLY FOR FABRICATION OF ROCKET DOMES

(75) Inventors: Henry W. Babel, Huntington Beach, CA (US); Douglas J. Waldron, Fountain Valley, CA (US); Ronaldo Reyes de Jesus, Huntington Beach, CA (US); William F. Bozich, Huntington Beach, CA (US)

(73) Assignee: The Boeing Company, Seal Beach, CA (US)

( * ) Notice: Subject to any disclaimer, the term of this patent is extended or adjusted under 35 U.S.C. 154(b) by 0 days.

(21) Appl. No.: 09/935,271

(22) Filed: Aug. 22, 2001

(51) Int. Cl.$^7$ ............................................... B23K 20/12
(52) U.S. Cl. ..................... 148/527; 148/535; 228/112.1; 228/114
(58) Field of Search ............................ 29/428; 148/527, 148/535; 228/112.1, 114

(56) References Cited

U.S. PATENT DOCUMENTS

| | | |
|---|---|---|
| 3,969,917 A | 7/1976 | Waterfall |
| 4,247,346 A | 1/1981 | Maehara et al. |
| 4,320,644 A | 3/1982 | Fischer |
| 5,597,529 A | 1/1997 | Tack ........................... 420/532 |
| 5,620,652 A * | 4/1997 | Tack et al. .................. 420/532 |
| 5,697,511 A * | 12/1997 | Bampton ................... 220/4.12 |
| 5,697,544 A | 12/1997 | Wykes |
| 5,758,999 A | 6/1998 | Geise |
| 5,769,306 A | 6/1998 | Colligan |
| 5,794,835 A | 8/1998 | Colligan |
| 5,810,949 A * | 9/1998 | Chakrabarti et al. ........ 148/535 |

(List continued on next page.)

FOREIGN PATENT DOCUMENTS

JP 2001001059 9/2001

OTHER PUBLICATIONS

ASM Handbook, vol. 2, Properties and Selection of Nonferrous Alloys and Special Purpose Materials, 1990.*
*Offshore*, Mar. 1996, "Friction stir welding method improves quality, productivity".
*Aviation Week and Space Technology*, Jul. 20, 1998, "Boeing Plans EELV/Delta 4 Horizontal Launch Processing".
*Research Reports: 1996 NASA/ASEE Summer Faculty Fellowship Program*, Oct. 1, 1996, "Process Model for Friction Stir Welding".
*American Machinist*, Mar. 1994, "Aluminum weld process eliminates distortion".
TWI, 28th, Apr. 1998, "Friction Stir Welding—Applications".
TWI (Published in Welding and Metal Fabrication, 2000, vol. 68, No. 7, Jul./Aug., pp. 12–14 by DMG World Media UK Ltd.), "Bringing aerospace welding specifications up to standard".
TWI, "Friction Stir Welding—Intellectual Property Rights".

Primary Examiner—George Wyszomierski
(74) Attorney, Agent, or Firm—Stout, Uxa, Buyan & Mullins, LLP; Donald E. Stout

(57) ABSTRACT

Large diameter dome tanks made of a plurality of plates friction stir welded together to form a blank and spun and/or stretched into form. The dome tanks may be for holding liquid rocket fuel. Methods of forming include friction stir welding two or more flat blanks together and spinning the combined workpiece into a hemisphere. The blanks may be sufficiently thick to enable stretching as well as spinning. Aluminum alloys may be used, and filler material may be included in thee friction stir welds to reduce grain growth and problems associated therewith in the spinning process.

17 Claims, 1 Drawing Sheet

U.S. PATENT DOCUMENTS

| | | |
|---|---|---|
| 5,811,755 A | 9/1998 | McGee et al. |
| 5,813,592 A | 9/1998 | Midling et al. |
| 5,862,975 A | 1/1999 | Childress |
| 5,971,247 A | 10/1999 | Gentry |
| 5,971,252 A | 10/1999 | Rosen et al. |
| 5,972,524 A | 10/1999 | Childress |
| 5,975,406 A | 11/1999 | Mahoney et al. |
| 6,003,755 A | 12/1999 | Shah et al. |
| 6,006,569 A | 12/1999 | Shrayer et al. |
| 6,070,784 A | 6/2000 | Holt et al. |
| 6,199,419 B1 * | 3/2001 | Shrayer et al. ............ 72/69 |
| 6,199,745 B1 | 3/2001 | Campbell et al. |

* cited by examiner

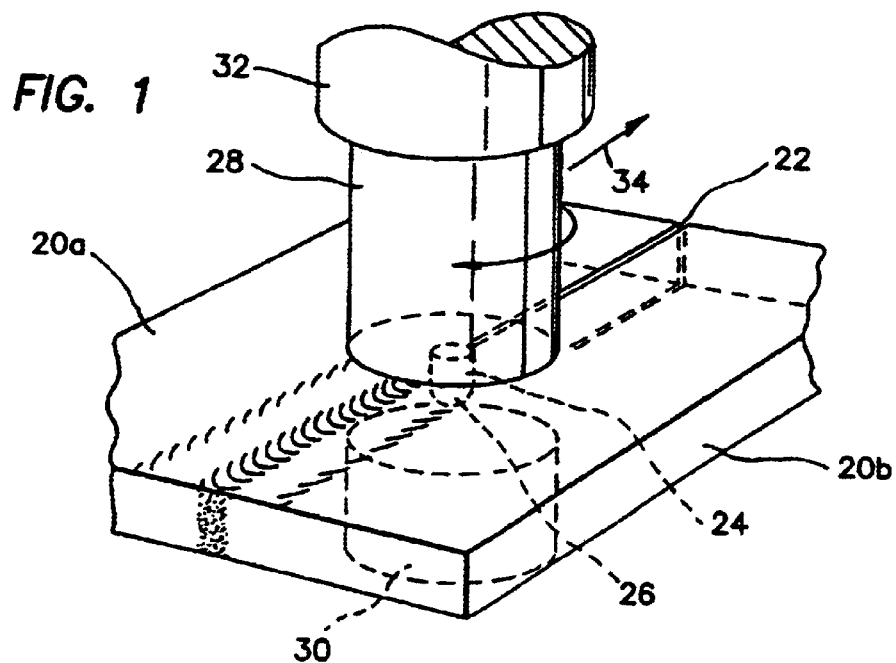
FIG. 1
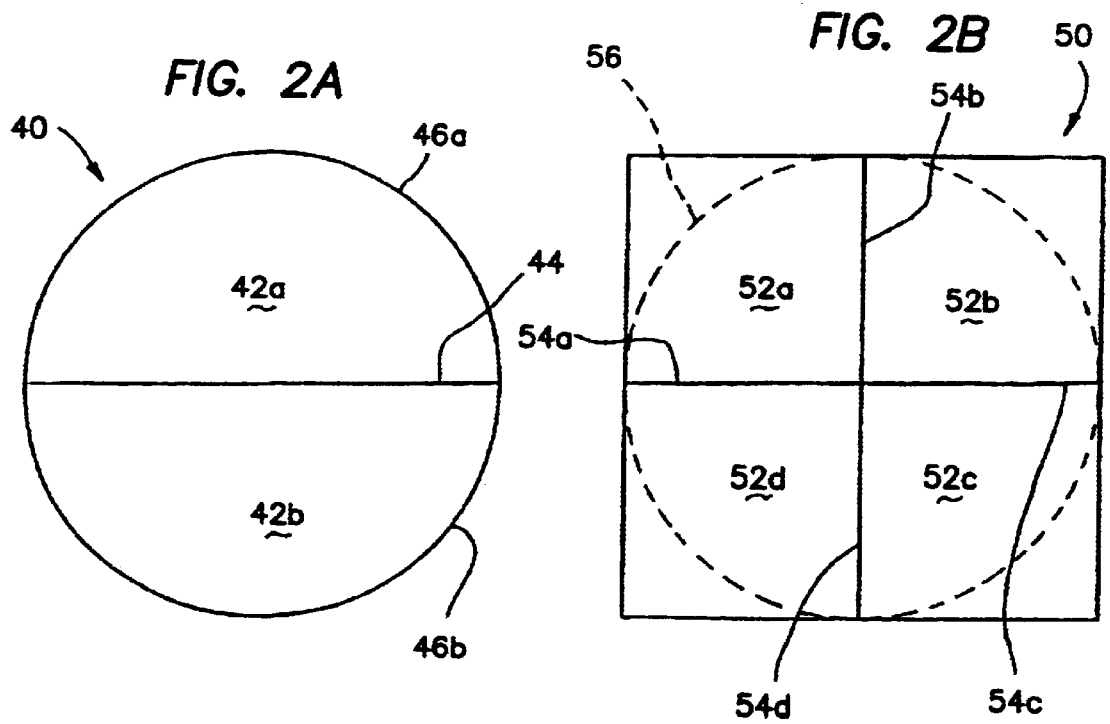
FIG. 2A
FIG. 2B

METHODS OF MANUFACTURE OF SPIN-FORMING BLANKS, PARTICULARLY FOR FABRICATION OF ROCKET DOMES

FIELD OF THE INVENTION

The present invention relates to methods of making large diameter domes for tanks such as liquid fuel rocket tanks and, in particular, methods of manufacture of such domes from undersized blanks.

BACKGROUND OF THE INVENTION

Advancements in satellites, and the enhancements to telecommunications and other services that sophisticated satellites make possible, have dramatically increased the number of commercial satellites being launched. As each launch is an expensive event, there has been a trend toward increasing the number of features and components on satellites, allowing multiple users to share the costs and benefits of the satellite launch. Increased features have resulted in an increase in the size of these satellites, and consequently the size of the launch vehicles required to carry these satellites into their operational orbit. Generally, satellite launch vehicles are multi-stage rockets, with each stage including its own fuel tank, comprising a cylindrical body having a domed leading end. It is in the manufacture of these larger rocket domes that current manufacturing methods fall short.

Rocket domes have typically been fabricated from single blanks of aluminum alloys or other alloys that are hot spun over mandrels to form the desired shape. Common mandrel spin forming methods include clamping a blank between a rotatable spindle and a die, or mandrel, corresponding to the shape to be formed. The clamped assembly is then rotated and the blank is heated while a tool, such as a spinning roller, is used to apply pressure, progressively, to a small area of the metal blank, thereby causing the small area to deform in the direction of the pressure. As the metal blank rotates, a circumferential band of the blank is progressively deformed and, by moving the spinning roller in a radial direction with respect to the rotating metal blank, the desired shape is produced.

Traditionally, rocket domes have been manufactured by the mandrel spinning process from blanks having a surface area that is greater than or equal to the surface area of the domes to be spun. This process results in a dome having the desired diameter and a substantially constant material thickness. Traditional hot mandrel spinning methods have been effective, as long as the surface area of the necessary blank was smaller than the largest commercially available blank diameter. However, to manufacture domes for large rockets using traditional mandrel spinning techniques would require a circular blank with an outside diameter well in excess of the maximum commercially available blank size (currently about 209 inch/5.31 m width plate from the Alcoa mill in Davenport, Iowa). One attempt to solve this problem is seen in U.S. Pat. No. 6,006,569 to Shrayer, et al.

Despite these prior art systems, there remains a need in the art for a less costly and more robust way to fabricate the end domes for large diameter tanks.

SUMMARY OF THE INVENTION

The present invention provides a method for forming large diameter hemispheric domes particularly useful for the leading end of launch vehicle fuel tanks. The method includes joining together by friction stir welding plates that are smaller than the largest premium sizes available, and spinning the formed blank. The friction stir welded joint line has material properties that are very similar to the surrounding base material, and thus the stresses imposed on the blank during the spin forming process do not create cracks or tearing. This is particularly true if the blank is first annealed.

An exemplary method of forming large hemispheric domes comprises providing at least two plates of material having abutting edges, friction stir welding the two plates together along the abutting edges to form a blank, and spin forming the blank into a dome. An alternative method according to the present invention includes providing at least two plates of material having abutting edges, welding the two plates together along the abutting edges to form a blank, and simultaneously spin forming and stretching the blank into a dome.

The two starting plates may be rectilinear, and the method further includes cutting the blank into a circle prior to the spin forming step. Alternatively, there may be four plates in the shape of squares that are friction stir welded together to make a larger square. Preferably the plates are at least 1 inch (2.5 cm) thick.

Desirably, the method includes heating the blank during the spin forming step, preferably to between 500° F. and 700° F. (260–371° C.). Furthermore, preferred method steps are annealing the blank prior to the spin forming step, and solution heat treating the dome. If the plates are Al 2219, then the annealing is done at about 775° F. (413° C.) for about 3 hours and then furnace cooling at 500° F. and then in the ambient air, and the solution heat treating is to T62 temper at 995° F. (535° C.).

A further aspect of the invention is placing a material that retards grain growth between the abutting edges of the plates prior to the friction stir welding step. For example, the material that retards grain growth may be an aluminum-scandium alloy.

Further objects and advantages of the present invention will become apparent to those skilled in the art upon reading and understanding of the following detailed description and accompanying drawings.

BRIEF DESCRIPTION OF THE DRAWINGS

These, as well as other features of the present invention, will become more apparent upon reference to the drawings wherein:

FIG. 1 is a perspective view of a conventional friction stir welding apparatus as it forms a butt joint between two plates;

FIG. 2A is a plan view of two semi-circular plates friction stir welded together to form a dome blank suitable for spinning; and FIG. 2B is a plan view of four square plates friction stir welded together to form a larger square, and an outline of a circular dome blank suitable for spinning.

DESCRIPTION OF THE PREFERRED EMBODIMENTS

The present invention provides improved large diameter domes for rocket fuel tanks, for example, and methods of forming such domes. The method comprises providing at least two blanks of sheet material and friction stir welding them together to form a large sheet, the sheet then being spin formed into a dome with or without simultaneous stretching. The invention can be practiced using numerous different materials, though certain aluminum alloys are preferred. Likewise, the number of blanks and their dimensions may vary without departing from the scope of the invention. Finally, numerous different friction stir welding techniques and apparatuses may be used.

Friction welding is based on the principal of "rubbing" together two articles to be joined so as to generate a sufficient amount of heat and plasticize the adjacent surfaces. The frictional heat is generated solely by the adjacent work pieces to be joined. Friction "stir" welding utilizing a rotating, non-consumable probe or pin has been developed. The pin is of a harder material than the work pieces to be joined, and relative cyclic movement of the pin generates the frictional forces to plasticize the workpiece material. Because of this movement of the non-consumable pin, the method has been named friction stir welding; with the pin "stirring" the material. Both friction and friction stir welding result in a solid state joint formed without exceeding the temperature at which the base metals will fuse. For typically aluminum alloys, such as 2219, this upper temperature limit is around 700° F.

In a conventional butt joint, for example, the pin spins or linearly reciprocates and travels along the interface between the adjacent or "faying" work piece surfaces to create the plasticize weld joint. Typically, the two work pieces are placed on a backing surface and are tightly held together to prevent separation during the friction stir welding process. Further, a stationary shoulder surrounding the moving pin applies forging pressure to the area around the faying surfaces on the opposite side from the backing surface to prevent the plasticized material from extruding out of the joint. The result is a relatively smooth and void-free joint.

In the conventional example shown in FIG. 1, a pair of aluminum alloy sheets or plates 20a, 20b butt together at a joint line 22. A non-consumable probe 24 of steel having a narrow central, cylindrical portion 26 positioned between upper and lower forging sections 28, 30 is brought to the edge of the joint line 22 between the plates 20a, 20b. A motor 32 rotates the probe 24 while the probe traverses in a direction 34 and while the plates are held against lateral movement away from the probe 24. The rotating probe 24 produces a local region of highly plasticized material around the steel "pencil" portion 26 while top and bottom constraints are provided by the sections 28, 30. It should be noted that the constraining faces of the sections 28, 30 are close fitting onto the plates 20a, 20b to be joined to avoid loss of material from the plasticized zone. The rotating probe 24 forces the plasticized material downward and backward in its "wake." When the probe 24 translates between the faying surfaces at the joint line 22, plasticized material flows from the front of the probe to the rear. The probe extends almost to the bottom of the material to be joined, but cannot extend all the way through so as to avoid contact with the lower forging section 30, which might pull support tooling debris into the weld.

An alternative friction stir welding tool that may be used replaces the lower forging section 30 seen in FIG. 1 with a flat base surface. The plates 20a, 20b lie flat on top of the base surface, which provides the backing reaction force against which the forging force of the upper forging section 28 is applied.

Planar circular blanks are used for spinning into domes to provide an axisymmetric spinning mass and so that the final rim of the dome is also circular. Circular blanks can be formed in a number of ways, as for example shown in FIGS. 2A and 2B.

FIG. 2A illustrates a circular blank 40 suitable for spinning into a dome and consisting of two semi-circular plates 42a, 42b joined along their juxtaposed radial edges with a friction stir welded joint line 44. It should be noted that the arcuate edges 46a, 46b of the plates 42a, 42b may be cut prior to welding the joint line 44, or after the circular blank 40 is fabricated.

FIG. 2B shows a square blank 50 consisting of four square plates 52a, 52b, 52c, 52d each connected along two side edges to two other plates with two of the illustrated friction stir welded joint lines 54a, 54b, 54c, 54d. A circular outline 56 of a blank suitable for spinning into a dome is shown, which blank may be cut out of the larger square blank 50. Alternatively, quarter circle edges may be cut from each of the smaller plates 52a, 52b, 52c, 52d prior to their combination into the larger blank 50.

After the circular blank is formed, it is spun into a dome using various conventional spin-forming tools. For example, Spincraft (500 Iron Horse Park, North Billerica, Mass. 01862) provides spin forming systems specifically designed to form launch vehicle rocket domes. Keystone Engineering Company (1444 South San Pedro Ave., Los Angeles, Calif. 90015) also supplies spin forming tools suitable for forming domes out of the blanks of the present invention.

Optionally, the circular blank may also be stretched as it is spun to increases its size. U.S. Pat. No. 6,006,569, which is hereby expressly incorporated by reference, discloses a system for both stretching and spinning a circular blank into a larger dome. Stretching is accomplished by heating the spinning blank, applying compressive forces along a select band of the blank, and progressively moving the compressed band radially outward on the blank. It should be noted that techniques such as friction stir welding, electron beam welding, tungsten arc welding, or laser welding may all be suitable for forming the blank that will be stretched and spun.

The present invention may be used to form larger domes than previously were available at a lower cost. While the formation of large domes from a single piece of aluminum alloy have been disclosed, those earlier processes required the largest starting blanks available at a premium cost (partly because of the cost of shipping such large pieces). The present invention permits smaller, lower cost plates to be first joined and then spun to form the largest domes currently required. The smaller plates may be rolled at a number of mills around the country, thus reducing shipping costs. The present process can be used to form domes of up to 5 meters in diameter, and theoretically larger, limited only by the capacity of the spin form tooling currently available.

Exemplary blank dimensions are 172 inches (437 cm) in diameter and 1.8 inches (4.6 cm) thick. Such a blank may be formed of two of more plates, as mentioned above. The same sized dome as can be formed by spinning a blank of 172 inches (437 cm) in diameter can be formed by spinning and stretching a blank having the same thickness but sized 150 inches (381 cm) in diameter.

The thickness of the plates used to form the circular blanks ranges from about 0.5 inch (1.3 cm) up to about 2.4 inches (6.1 cm), and preferably greater than 1.0 inch (2.5 cm) thick. The thickness depends on the final product requirements, and also on whether stretching will be used, which results in some reduction in thickness. A preferred thickness is about 1 inch (2.5 cm). The solid state joint provided by the friction stir welding process is essentially indistinguishable from the remainder of the piece, with minimal grain growth and subsequent reduced potential for cracks or tearing of the material during the spinning and/or stretching steps.

To help ensure the highest quality material properties in the weld joint, heat treating is desirably performed before or after the spinning operation. The welded blank is given a two-step anneal beginning with a solution heat treat followed by a furnace cool to the standard annealing temperature at which a standard anneal is performed. A-basis allowable-strength properties are obtained after heat treatment in weld regions that are non-cold worked as well as in the cold worked areas. In most cases, the elongation specified in MIL-HDBK-5 is achieved.

One specific heat treatment for Al 2219 plates friction stir welded together includes annealing at 775° F. (413° C.) for 3 hours and then furnace cooling at 500° F. and then in the ambient air. The spin forming is desirably done at an elevated temperature of between 500° F. and 700° F. (260–371° C.). After spin forming, the dome is heat treated to T62 temper by solution treating at 995° F. (535° C.) and then aged at 375° F. (191° C.) for 36 hours.

Materials that may be used include various aluminum alloys, in particular 2219, aluminum-lithium alloys, metal matrices, and nanophased metals (i.e., impregnated with composites). Certain alloys may experience grain growth during the friction stir welding process, but the result can be improved with the use of a metal matrix sandwiched between the two abutting edges of the base material. For example, plates of Al-Li alloy may be friction stir welded together with greater success and less grain growth by inserting a sliver (0.010–0.25 inch 0.25–5.35 mm thick) of metal matrix or a different AL-LI alloy between the faying edges. Aluminum-scandium alloys are useful in retarding grain growth.

Additional modifications and improvements of the present invention may also be apparent to those skilled in the art. Thus, the particular combination of parts described and illustrated herein is intended to represent only one embodiment of the present invention, and is not intended to serve as limitations of alternative devices within the spirit and scope of the invention.

What is claimed is:

1. A method of spin-forming a dome shaped article, comprising:

providing at least two substantially planar pieces of material having abutting edges;

friction stir welding said material pieces together along said abutting edges to form a blank suitable for spin-forming; and spin-forming the blank into a desired article.

2. The method as recited in claim 1, wherein said article comprises a dome for an aerospace application.

3. The method as recited in claim 1, wherein said article comprises a dome for a rocket.

4. The method as recited in claim 1, wherein there are four of said substantially planar pieces of material which are friction stir welded together to form said blank.

5. The method as recited in claim 1, wherein said two material pieces are rectilinear, and said method further comprises cutting said blank into a circular shape prior to performing said spin-forming step.

6. The method as recited in claim 1, wherein said material comprises an aluminum alloy.

7. The method as recited in claim 1, and further comprising stretching the blank during the spin-forming step.

8. The method as recited in claim 1, and further comprising heating the blank during the spin-forming step.

9. The method as recited in claim 1, and further comprising annealing the blank prior to the spin-forming step.

10. The method as recited in claim 9, and further comprising solution heat treating the article.

11. A method of fabricating hemispheric domes, comprising:

providing at least two portions of material having abutting edges;

friction stir welding the two material portions together along the abutting edges to form a blank; and spin-forming said blank into a dome.

12. The method as recited in claim 11, wherein said two material portions are rectilinear, and said method further comprises cutting said blank into a circular shape prior to performing said spin-forming step.

13. The method as recited in claim 11, wherein said material comprises an aluminum alloy.

14. The method as recited in claim 11, and further comprising stretching the blank during the spin-forming step.

15. The method as recited in claim 11, and further comprising heating the blank during the spin-forming step.

16. The method as recited in claim 11, and farther comprising annealing the blank prior to the spin-forming step.

17. The method as recited in claim 16, and further comprising solution heat treating the dome.

* * * * *

UNITED STATES PATENT AND TRADEMARK OFFICE
CERTIFICATE OF CORRECTION

PATENT NO. : 6,660,106 B1
DATED : December 9, 2003
INVENTOR(S) : Babel et al.

It is certified that error appears in the above-identified patent and that said Letters Patent is hereby corrected as shown below:

Title page,
Item [57], ABSTRACT,
Line 9, after "in", change "thee" to -- the --.

Column 5,
Line 39, after "dome", delete the work "shaped".

Column 6,
Line 40, after "and", change "farther" to -- further --.

Signed and Sealed this

Twenty-ninth Day of June, 2004

JON W. DUDAS
*Acting Director of the United States Patent and Trademark Office*